Dec. 18, 1962  J. F. MACHEN  3,068,798
METERING PUMPS
Filed March 9, 1959
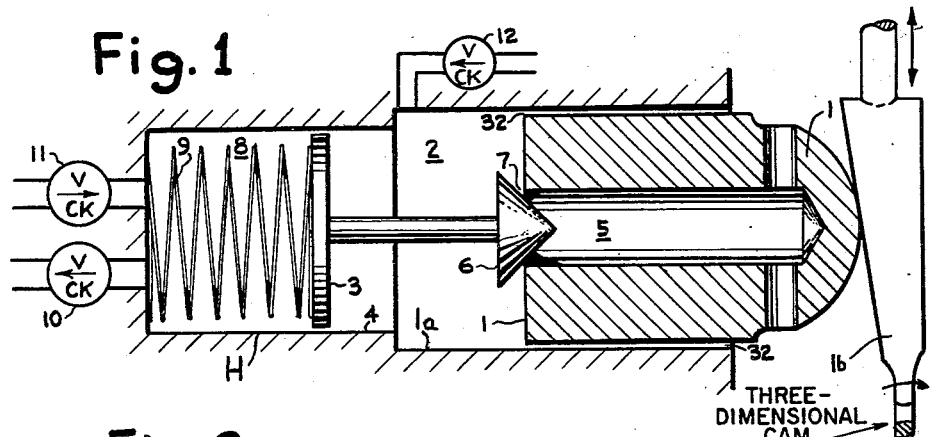
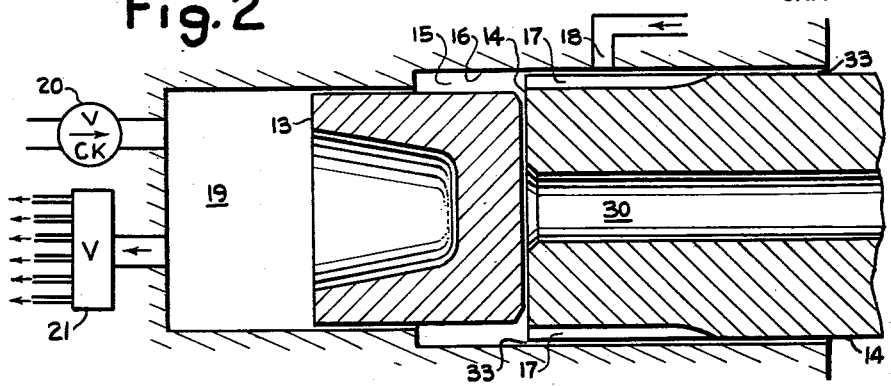
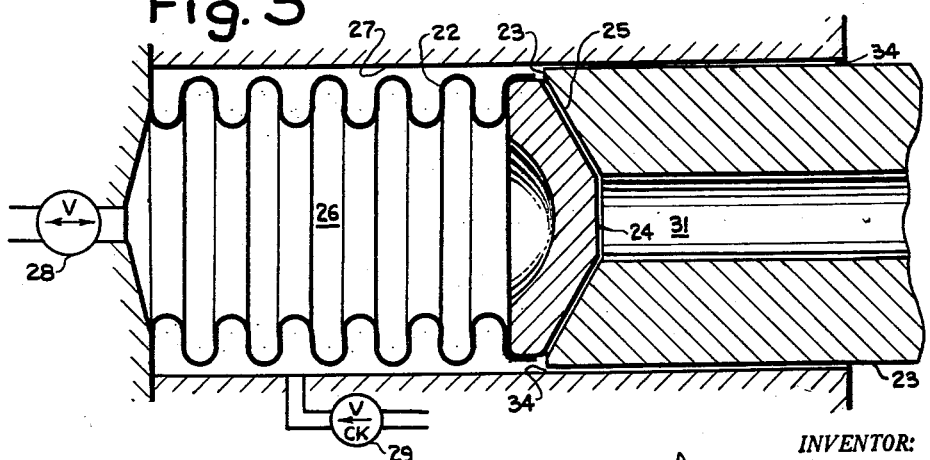
INVENTOR:
James F. Machen

United States Patent Office 3,068,798
Patented Dec. 18, 1962

3,068,798
METERING PUMPS
James F. Machen, Toledo, Ohio, assignor to Simmonds
Precision Products Inc., a corporation of New York
Filed Mar. 9, 1959, Ser. No. 798,125
5 Claims. (Cl. 103—44)

This invention relates to metering pumps and more specifically to a novel means of sealing the plunger of a reciprocating metering pump such as a fuel injection pump.

Most fuel injection pumps made at present utilize pumping plungers which are fitted to the mating chamber bore with extremely small clearances. This is especially required of gasoline injection pumps. These small clearances are costly and not well adapted to mass production techniques. Furthermore, wear and erosion cause rapid increase in these clearances with resultant leakage and loss of metering accuracy. In addition, even the smallest particle of dirt, grit, or other foreign matter in the fuel can cause damage and therefore must be removed with elaborate filtering devices. All of these factors contribute to the undesirability of relying upon close clearances as plunger seals in fuel injection pumps.

Attempts have been made to adapt mechanical seals as plunger seals with inadequate results. Wear of such seals becomes a major problem and the high pressures that are usually found limit their usefulness. Plungers with mechanical seals require a variable stroke for control of metering since valving slots and cuts in the plunger are not possible.

The use of collapsible pumping chambers such as diaphragms, bellows, capsules, and the like will provide proper sealing, but problems of fatigue and related deterioration due to flexing and pressure stresses limit their usefulness.

In offering a solution to the above mentioned problems it is the principal object of this invention to provide a metering pump plunger sealing means that eliminates the requirement of an extremely close fit with the mating bore.

A further object of this invention is to eliminate fuel leakage in the plunger clearance altogether.

A further object of this invention is to permit a very high degree of metering accuracy to be attained.

A further object of this invention is to provide a seal in which wear has a negligible effect on the accuracy of metering or the operation of the pump.

A further object of this invention is to reduce the degree of fuel filtration required.

A further object of this invention is to provide a seal that is subject to a minimum of the deteriorating effects of fatigue and the like and which will have a long useful life and not be subject to sudden failure.

A further object of this invention is to provide a seal that is simple and low in cost.

Other objects and advantages of this invention will be more apparent from the following description taken in connection with the accompanying drawings, in which:

FIG. 1 is a sectional view of a portion of a metering pump housing illustrating a plunger and bore which serves to illustrate the principle of the present invention;

FIG. 2 is a sectional view similar to FIG. 1 of the plunger and bore of another embodiment of this invention;

FIG. 3 is a sectional view of another pumping chamber illustrating a further embodiment of this invention.

The method used to achieve the objectives set forth has several underlying principles which are illustrated by FIG. 1 and are explained as follows: Although gasoline, diesel fuel, or other fluid is being pumped, plunger 1 which is movable in a bore 1a of a housing H provides with said bore a chamber 2 which is filled with a different fluid having certain properties to be described later, hereinafter referred to as "seal fluid." Means of separating this seal fluid from the fluid being pumped is provided in the form of a barrier-piston 3 situated in bore 4 also in housing H and having a diameter somewhat smaller than that of plunger 1. Passage 5 in plunger 1, together with extension 6 of piston 3, form valve 7 sensitive to the location of piston 3 relative to plunger 1.

In operation, as plunger 1 advances to the left as viewed in FIG. 1 on the injection stroke, piston 3 will initially advance at a faster rate than plunger 1 because of their different rates of volume displacement, but in doing so opens valve 7 to bypass the excess seal fluid through passage 5. Since during the injection stroke no force is transmitted between plunger 1 and piston 3 (valve 7 being open as seal fluid is being by-passed), the pressure in fuel chamber 8 is essentially equal to that in chamber 2 except for the effect of spring 9. The pressure of injection through check valve 10 is built up by plunger 1 acting on the seal fluid in chamber 2. There is relatively little tendency for leakage to occur between the chamber 2 and chamber 8 during injection.

On the intake stroke of plunger 1, i.e., movement to the right as viewed in FIG. 1, fuel enters chamber 8 via check valve 11; spring 9 causes valve 7 to be closed; and seal fluid enters chamber 2 via check valve 12 restoring the initial condition.

The metering of this pump is thus a function of the stroke of plunger 1 and the diameter of piston 3 and can, of course, be varied by employing a variable stroke mechanism of any type such as a cam 1b to operate the plunger. Of necessity the stroke of the plunger is limited because of the dual diameter of the bore. This practical limitation would probably restrict the range of workable stroke lengths to a maximum of approximately .5 the plunger diameter.

In another embodiment of this invention illustrated by FIG. 2, barrier-piston 13 replaces analogous piston 3 and its extension 6. The mating surfaces of piston 13 and plunger 14 function together as a valve in analogous fashion to valve 7, with the seal fluid now being by-passed through passage 30. A differential in diameter between piston 13 and bore 16 forms an annular chamber 15 (analogous to chamber 2) which contains seal fluid. Entry of seal fluid into chamber 15 during the intake stroke of plunger 14 is valved by means of slots 17 in plunger 14. Relative rotary motion between bore 16 and plunger 14 in proper timed relationship to the stroking of plunger 14 allows port 18 to be in communication with one of slots 17 only during the intake stroke of plunger 14, performing a function analogous to that of valve 12.

Fuel enters chamber 19 via check valve 20 on the intake stroke of plunger 14. Positive pressure of the fuel on entry causes piston 13 to follow the return motion of plunger 14. During injection the fuel is forced out through distribution valve 21, a rotary or other valve timed to the stroking of the plunger 14, which distributes the fuel as desired.

The cup-shape of piston 13 has no specific relationship with its sealing function, but serves to illustrate a method of weight reduction. Piston 13 is best made of a light, hard material such as alumina or compacted and sintered graphite.

Another preferred embodiment of this invention is illustrated by FIG. 3. In this version, metal bellows 22 having an effective diameter somewhat smaller than plunger 23 acts with plunger 23 in a manner analogous to the plunger-piston combinations shown in FIGS. 1 and 2. Frustro-conical end-piece 24 brazed to bellows 22 functions with mating seat 25 of plunger 23 as the analogous valve of this embodiment. Bellows 22 and its end-piece 24 form a sealed collapsible chamber 26 which totally eliminates the possibility of intermixing of seal fluid with the fluid being pumped. The remainder of the bore 27 surrounding bellows 22 is filled with seal fluid and is analogous to chamber 2.

In this embodiment, on the intake stroke of plunger 23 the positive pressure of the fuel together with the expansion of the bellows 22 causes fuel to enter chamber 26 through valve 28 (a rotary or other valve combining the functions of valves 20 and 21 of FIG. 2), and seal fluid enters through inlet check valve 29. On the injection stroke, fuel is forced out through valve 28, whence it is distributed as desired. Seal fluid is by-passed through passage 31 in accordance with the valve action of end-piece 24 as it mates with plunger 23 in a manner similar to that of valve 7.

Except for the effect of the spring rate of bellows 22, the pressure in the fuel chamber 26 will be essentially equal to that developed in the surrounding seal fluid. This is of considerable importance since the only stress which will be present in bellows 22 during high pressure injection will be that due to the flexing of the bellows walls, since no pressure stresses will be caused. When flexing stresses are kept low through the use of a suitably large number of convolutions and/or a thin bellows wall thickness, long life under fatiguing conditions may be expected.

It is desirable to supply seal fluid to inlets 12, 18, and 29 in the configurations of FIGS. 1, 2, and 3, respectively, with some degree of positive pressure to insure its proper flow into the chambers 2, 15, and 27 during the intake stroke. Various means may be employed to obtain this positive pressure, e.g.: gravity, hydrodynamic, or other means. By-pass passages 5, 30, and 31 each drain to, or otherwise communicate with, a seal fluid sump or the like. It is possible to use this seal fluid as a lubricant for other parts and component mechanisms associated with the pump of the present invention. The exact method of supply and retrieval of seal fluid and its extent of secondary usage are not considered to be a part of this invention.

The seal fluid referred to throughout this specification is a liquid which has the following properties:

A. Viscosity in a range dictated by its ability to develop the required pressures under operating conditions with plunger clearances (32, 33, and 34) in the range of from .0001 to .002 inch. This would require a viscosity in the range of from approximately 30 to 500 Saybolt Universal seconds at operating temperatures;

B. Lubricating properties as dictated by the wear and sliding friction conditions in the pump and component mechanisms requiring lubrication;

C. Immiscibility with the fuel or other fluid being pumped. When the seal fluid and the fuel are miscible, minute quantities of each tend to mix in the barrier-piston clearances, dissolving in one another, and slowly diluting the seal fluid or carrying it away. When the two are immiscible, this dilution and loss is virtually eliminated. While a seal fluid will function quite well without this property of immiscibility, it is considered by the inventor to be of major significance in the present invention. This property, of course, would not be required in the configuration of FIG. 3.

I wish it to be understood that this invention is not limited to the specific constructions shown and described, except as so provided in the appended claims. Those skilled in the art will understand that changes may be made without departing from the principles set forth.

I claim:

1. A metering pump comprising a housing having a pair of communicating axially disposed bores of different diameters, the smaller of said bores having a substantially closed end, a fluid pressure responsive member movable in the bore portion of smaller diameter and forming with said closed end a metering chamber, said pressure responsive member, said bore of larger diameter and said plunger forming a sealing-liquid chamber, a plunger reciprocable in said sealing-liquid chamber, said housing having inlet and outlet valves for controlling the passage of liquid fuel into and out from said metering chamber and having a separate valved inlet passage leading to the sealing-liquid chamber for admitting thereinto a sealing-liquid other than liquid fuel, said plunger having an outlet passage communicating with said sealing-liquid chamber, and a valve device on said fluid pressure responsive member for coacting with the outlet passage in the plunger in a manner such that on the non-working stroke of the plunger the valve device closes said outlet passage and on its working stroke will operate to (1) pressurize sealing-liquid in the sealing chamber, (2) cause unseating of the valve device to permit part of the pressurized sealing-liquid to discharge through the outlet passage in the plunger, (3) transmit said pressure entirely hydraulically in direct phase and amplitude to pressurize liquid fuel admitted to the metering chamber, (4) diminish the tendency of the pressurized fuel to leak past the pressure responsive member and (5) cause the pressure responsive member to discharge the pressurized fuel.

2. A metering pump according to claim 1 wherein the plunger is reciprocable with a variable stroke.

3. A metering pump according to claim 1 wherein the inlet and outlet valves for controlling the passage of liquid fuel into and from the metering chamber are at the closed end of said metering chamber.

4. A metering pump according to claim 1 in which the fluid in said second chamber is immiscible with the fluid being pumped.

5. A metering pump comprising a housing having a bore with one end substantially closed; a plunger adapted to reciprocate in said bore with a variable stroke; a bellows sealably attached at the closed end of said bore with its free end projecting into said bore toward said plunger; a head closing the free end of said bellows; said closed bore end, the inside wall of said bellows, and said bellows head forming a first chamber; said bellows head, the outside wall of said bellows, said bore, and said plunger forming a second essentially annular chamber; valved inlet and outlet passages communicating with said first chamber; a valved inlet passage communicating with said second chamber; an outlet passage passing axially through said plunger and communicating with said second chamber; a portion of said bellows head acting with said plunger and its axial outlet passage in such a manner that a valve sensitive to the position of said bellows head relative to said plunger is formed thereby.

References Cited in the file of this patent

UNITED STATES PATENTS

| 1,949,789 | Dussmann | Mar. 6, 1934 |
| 2,033,579 | Koster et al. | Mar. 10, 1936 |
| 2,041,468 | Grubbs | May 19, 1936 |

FOREIGN PATENTS

| 766,305 | Great Britain | Jan. 16, 1957 |
| 798,995 | France | May 29, 1936 |

OTHER REFERENCES

Germany (German application KL 59a 35), 1,001,111, Jan. 17, 1957.